Fig.1.

March 23, 1954   D. E. RAILTON   2,672,792
MACHINERY USED IN PRODUCING FOIL CAPSULES
FOR BOTTLES AND CONTAINERS
Filed April 17, 1950   9 Sheets-Sheet 3

Fig.3.

Inventor:
Denis Easthope Railton;
By his attorneys,
Baldwin, Wight + Prevost

D. E. RAILTON

2,672,792

MACHINERY USED IN PRODUCING FOIL CAPSULES
FOR BOTTLES AND CONTAINERS

Filed April 17, 1950

Patented Mar. 23, 1954

2,672,792

UNITED STATES PATENT OFFICE 2,672,792

MACHINERY USED IN PRODUCING FOIL CAPSULES FOR BOTTLES AND CONTAINERS

Denis Easthope Railton, East Burnham, England, assignor of one-half to Ideal Capsules Limited, Slough, England, a British company Application April 17, 1950, Serial No. 156,251

3 Claims. (Cl. 93—60)

This invention relates to the manufacture of pleated metal foil capsules.

These capsules are usually in the form of a cone, and are made from metal foil strip in an automatic machine which cuts out a circular blank from the strip and then makes pleats radially round the periphery of the blank as it is drawn into shape.

A capsule forming machine for making such capsules is the subject of British Patent No. 409,185.

The pleats may be flattened which involves, under existing practice, the necessity of a second operation in an independent machine to flatten the pleats.

One object of this invention is to provide a method and machine capable of combining the metal foil capsule forming and pleat smoothing operations in the one machine without intermediate handling of the capsules. Another object of the invention is to provide a machine which will deliver the finished metal foil capsule, following pleating and smoothing, and other operations as may be required, e. g. end embossing, in timed sequence, thereby enabling capsules readily to be counted, stacked, and delivered in batches. Another object of the invention is to slow down the speed and reduce the movement of the foil blanking operation in order to retain a cutting edge on the knife. A further object of this invention is to utilise a quick return action on the operating ram of the machine so that more capsules can be made in a given time without increasing the speed of forming, to provide a cushion drive for the machine and to incorporate a speed reduction gearing.

Another object of the invention is to provide a machine with a processing head capable of receiving a plurality of capsules simultaneously and with which other processing units, e. g. pleat smoothing, printing or adhesive applying, including discharge means, are associated for performing other operations on the pleated metal foil capsule.

The invention is illustrated in the accompanying drawings in which.

The remaining views are on an enlarged scale.

Referring to the accompanying drawings, the machine comprises a bed B supported on legs A and having a head H, in which the capsule forming plunger and matrix are mounted to reciprocate and provided with an intermittently revolving table T, onto which pleated but only partly finished capsules, indicated at C (Figure 12) are delivered from the matrix. Finished capsules are finally delivered from the table on to a delivery and processing unit indicated at D and comprising a collecting chute into which predetermined quantities of capsules are packed head to tail. The delivery unit consists of a pedestal bracket, detachably fixed to or hingedly mounted on bed B and incorporating a smoothing unit indicated generally at F, an end embossing, printing or like unit and an ejection unit. Foil is supplied from a standard type of feed roll mechanism indicated generally at G and also mounted on the machine head H. The web roll is indicated at R from which the length of web L is drawn off by co-operating rollers. Drive is from a motor M at floor level which may be mounted on one of the legs A to a main wheel W freely rotatable on a crank shaft S.

In the machine of this invention, the formation of the capsule is by means of a grooved plunger indicated at I, having ribs I' thereon which plunger co-operates with an open ended matrix 2 so that the capsule on being pleated is delivered on the far or open side of the matrix where it is received by one of a plurality of pockets secured to or integral with a plate 3 forming part of the table T, there being five pockets or capsule receiving positions respectively indicated at 4 in the table. The formation of the capsule is by forcing the blank completely through the matrix, whereas the existing practice in the production of metal foil capsules is to extract the shaped and pleated capsule when withdrawing the plunger at the wide end of the matrix. By increasing the length of stroke of the plunger so that it passes right through the matrix or die, we are enabled to discharge the capsule on the far side where it can be picked up by the delivery unit, provision of which was obviously impossible in existing practice owing to lack of space between die and plunger. The advantage of this method of operation is that other processing of the foil capsule, e. g. smoothing, embossing and even colour printing can be completed in the one machine whereas previously these operations had to be carried out in separate machines involving additional handling and possible damage to the capsule.

Blanking and capsule forming operation

Figure 8:
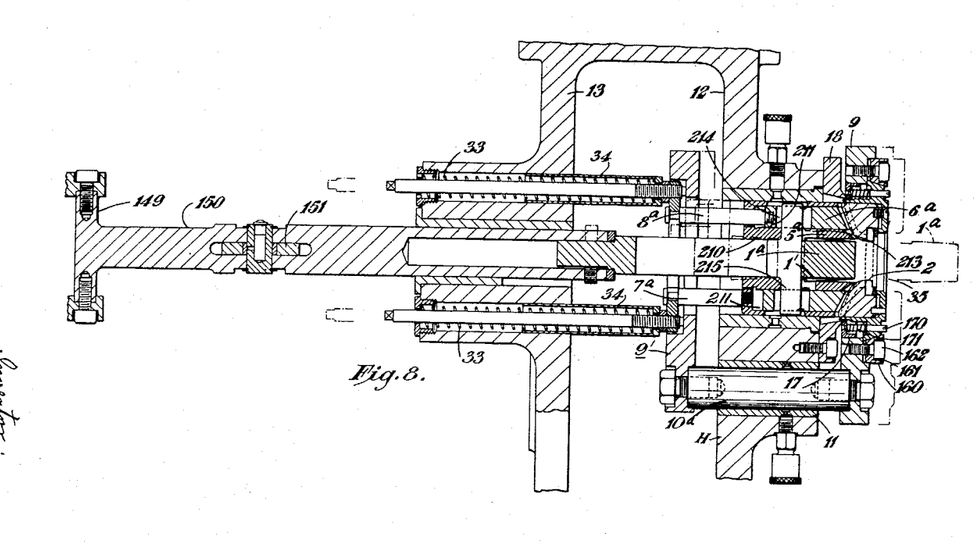
Figure 8 is a modification of the mechanism shown in Figure 5.

Associated with the main plunger 1 are inner and outer shaping pistons 5, 6. The shaping pistons 5, 6 are capable of movement relatively to the plunger 1 and for this purpose are spring loaded, being mounted on alternately arranged sets of plungers 7, 8 of which there are three in each set. The plungers 7, 8 are concentric with the centre line of the machine and mounted in the head H. The head H (see Figures 1, 2, 5 and 8) also carries a matrix plate 9 which is bolted to the front end of four large diameter plungers 10 slidable in bearings 11 in the front wall 12 of the head H, the rear wall being indicated at 13. Since the matrix plate, as will be hereinafter described, carries the moving part of the cutting knife for cutting out circular blanks from the web of foil, it receives a to and fro axial motion with each complete stroke of the plunger. For this purpose, plungers 10 are fast at their ends with a back plate 44 (Figure 5) or 9' (Figure 8). The extent of this to and fro cutting motion is indicated by the dash and peck lines in Figure 8 but it should be noted, as will hereinafter be described, that the movement of the matrix plate 9 is a comparatively short one since it is no longer necessary for it to be withdrawn, on completion of the pleating operation, from the head H an amount equal to the length of the capsule so as to enable the latter to drop clear of the matrix on extracting the plunger 1, as was formerly the case with the machine of British Patent No. 409,185. This movement is not shown in the Figure 5 embodiment, where the matrix is shown in withdrawn position to give access to the plunger and fixed part of the knife for a purpose which will be explained. The matrix plate 9 carries the matrix proper with its shaping faces 15, in which are radial pleat forming grooves 15' for cooperation with the pleat forming grooves 5', 6' on the shaping pistons 5, 6 as will hereinafter be explained.

The knife is in two portions 16, 18 and is annular in shape so as to cut a circular blank. The part 16, which constitutes the hard or cutting blade, surrounds the matrix 2 also being mounted in the plate 9. Immediately surrounding the knife portion 16 is a stripper ring 17, which as shown is spring loaded being slidably mounted on pins 170 against the action of springs 171. The knife blade proper 16 extends slightly outwardly from a base, which is drilled to receive the pins 170 and is held in place by a ring 160 having countersunk recesses 161 to receive the heads of fixing screws 162. The soft part 18 of the knife has an upstanding lip or rim 180 (Figure 5) within which the sharp or cutting edge 16 of the moving knife passes to cut out a circular blank from the length of web L. During cutting of the blank, the stripper ring 17, which is moving with the matrix plate 9 and its knife part 16 towards the plunger will engage the circular flat 181 (Figure 5) of the knife part 18 when springs 171 will exert sufficient pressure on the web to prevent distortion as the blank is cut out.

It should be noted that the plunger 1 takes no part in the initial formation of the pleats in the capsule C, the pleat shaping and forming operation being performed by the annular shaping pistons 5 and 6 in cooperation with the shaping face 15 of the matrix 2, the grooves 5', 6', respectively, of the shaping pistons engaging the grooves 15, in the matrix 2 with the foil intergrooves 15, in the matrix 2 with the foil interposed. The plunger 1 assists in the formation of the pleats in the capsule by drawing the foil into the channels provided by the mating surfaces of the corrugations 5', 6' and 15' and draws the pleated capsule from the matrix on the side thereof away from the shaping pistons 5 and 6. In order to complete the formation of the pleats in the capsule as it is drawn from the matrix by the plunger 1 and to prevent any possible deformation thereof, the plunger 1 is provided throughout its length with tapered ribs 1' which are spaced to interlock and work coaxially with grooves 15" formed in the throat of the matrix 2 and thus exert an "ironing" effect on the already formed pleats in the capsule as the latter is carried by the plunger through the throat of the matrix 2 to discharge the capsule.

In operation, therefore, as the plunger 1 is advanced to discharge the capsule, the ribs 1' enter the grooves between the pleats formed in the capsule by the grooves 5', 6' and 15' of the shaping pistons and matrix, respectively. Then, as the plunger advances and passes through the throat of the matrix 2, the pleats become more closely and sharply defined by the "ironing" action of the grooves 15" of the matrix. The ribs 1' on the plunger are formed parallel to the plunger axis lengthwise but are arranged at a small angle to the truly radial position in their depth. The grooves 15" in the throat of the female die or matrix are similarly twisted from their truly radial position to correspond.

It should also be noted that the head of the plunger 1 has an end diameter corresponding to the top of the pleated capsule C while at the base of the ribs 1' the diameter of the plunger 1 is slightly less than the minimum diameter of the throat of the matrix 2 at the top of the ribs between the grooves 15".

It should be understood that for the first part of the forward movement of the plunger 1, the shaping pistons 5 and 6 will move with the plunger, but during the latter part of its movement, the forward movement of shaping pistons 5 and 6 is arrested by adjustable stops, hereinafter described, to ensure a predetermined spacing from the matrix 2. When this takes place, the plunger completes the remainder of its stroke alone, during which time it will draw the pleated capsule clear of matrix 2 to discharge it.

Figure 5:
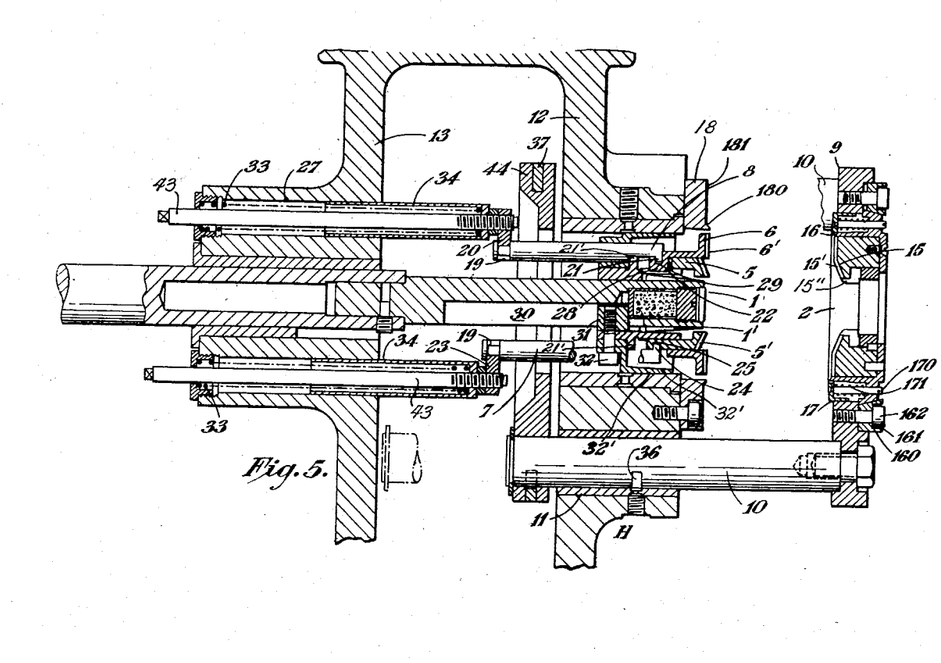
Figure 5 is a longitudinal sectional view of the plunger mechanism and its associated matrix or forming die, the latter being shown in its open position to give access to the plunger.

In the construction shown in Figure 5, the plungers 8 are connected at their rear ends to spider arms 20, the latter being forked to engage grooves 19 in the plungers, which are formed at their forward ends with elongated slots forming claws 21 to engage in a circumferential groove 22 in the outer shaping piston 6. Similarly the plungers 7 are connected at their rearward ends to other but similar spider arms 23 and at their forward ends have claws 24 to engage a groove 25 in the inner shaping piston 5. The shaping pistons 5, 6 are keyed to one another by means of three ribs 28 on piston 6 engaging grooves 29 in piston 5, the purpose of which is to permit of relative movement between 5 and 6 as they advance to mate with the matrix 2 in forming the corrugations. Between the plunger 1, and shaping pistons 5, 6 is a lost motion connection to enable the plunger, when the pleated capsule is formed, to move forward to draw the capsule out of the matrix and deliver it on the open side. For this purpose in the Figure 5 construction there is formed in the plunger 1, a slot 30 in which engages a key 31, the key 31 being bored to receive a screwed locking pin 32 which passes through a hole in a guide sleeve 32' for the shaping pistons 5 and 6. It will further be seen that the elongated slots in the front ends of plungers 7 and 8 also accommodate a flange 21' on the sleeve member 32'. Since therefore the shaping pistons 5 and 6 are also connected to the plungers 7 and 8 at 21 and 24, the abutment provided by the elongated slots will limit the forward movement of the parts 5 and 6 via the connection through the key 31 and sleeve 32'. The plungers 7, 8 are spring loaded by means of springs 33 housed in drillings 27 in the head piece H and enclosed at their forward ends in sleeves 34. When the main forming plunger 1 commences to move forward, the plungers 7, 8 and the sleeves 34 will by reason of the spring loading move forward with it until, as stated above, they are arrested by contact of the ends of the adjustable screwed rods 43 with the back plate 44, at which time the plunger 1 will pass through the open mouth indicated at 35 of the matrix to eject the partly finished but pleated capsule.

In the construction shown in Figure 8 the inner shaping piston 5a is in the form of a sleeve having a central bore 210 to receive the plunger 1a and the metal wall of the sleeve is counterbored to provide an annular recess 211 within which the outer shaping piston 6a is slidably mounted. The base of the sleeve 5a is drilled for the attachment of the plungers 7a and for the passage of the plungers 8a and in order to permit of axial displacement of both shaping pistons 5a and 6a relative to one another and the plunger 1a, slots 213, 214 are cut in each section to receive the cross key 215 carried by the plunger 1a.

Figure 9:
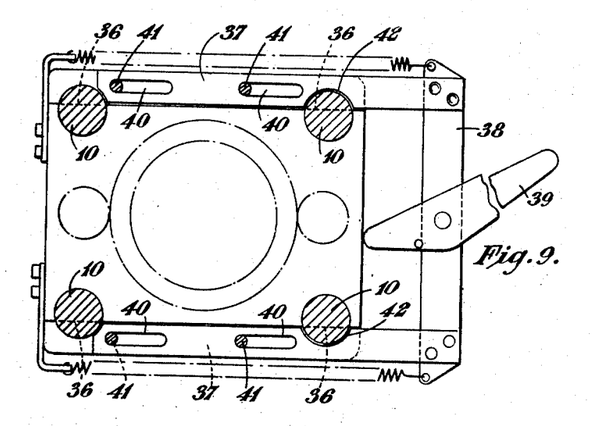
Figure 9 is an elevational view of a tool stop plate.
Figures 10, 11, 12:
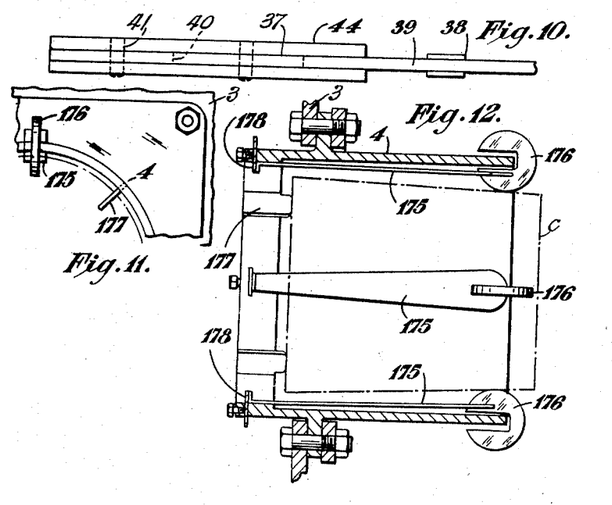
Figure 10 is a plan view of the tool stop plate.
Figure 11 is a fragmentary end elevational view of a capsule receiving cup mounted on the turntable.
Figure 12 is an axial sectional view of the capsule receiving cup, some parts being shown in elevation.

In the Figure 8 construction the plungers 10a are fastened to the back plate 9' by screws and there, if it is necessary to have access to the matrix or plunger for the purpose of clearing a broken capsule or to inspect the knife or to sharpen it, the matrix plate 9 has to be unbolted either by unscrewing the front fixing screws when it can be taken off completely or by means of the back screws when it can be slid forwards on plungers 10a to a release position corresponding to the position in which it is shown in Figures 5, 9, and 10.

To avoid undoing the screws, a quick release mechanism can be provided. For this purpose the large plungers 10 shown in Figure 5 are formed with locking grooves 36 (see Figures 5, 9 and 10) for co-operating with key elements 37, of which there are two slidable in the back plate 44 (Fig. 5) fast with a vertical cross bar 38 spring loaded toward the back plate and attached to a cam release lever 39.

It will be noted that the key elements 37 are slotted as at 40 to engage retaining pins 41 to limit the transverse sliding movement of keys 37 under action of lever 39 pressing against the side of the back plate. In each of the key elements 37 are semi-circular cut outs 42 of a diameter slightly greater than that of plungers 10, which, when the lever 39 has been depressed, will be moved to a position coincident with the plungers 10 so that the keys 37 are disengaged from the grooves 36 thereby enabling the matrix plate 9 to be drawn forwards away from the plunger face. At intervals dependent on the capacity and output of the machine the hard cutting knife 16 will require its cutting edge to be reground. At such times it is necessary to tap up the other and soft knife portion 18 for which purpose it is formed with a taper lip 180, which may be tapped up. To be able to do this, it is necessary to insert a hammer between the matrix plate 9 and the knife blade 18 and tap against the taper surface 180 so distorting material inwards to form a new cutting edge when hard knife 16 next enters the soft knife 18. This is rendered possible when the matrix plate 9 has been moved to its released position as shown in Figure 5.

With the machine of this invention, where the matrix plate 9 no longer has to be moved clear of the former to permit the removal of the pleated capsule, prior to the next pleating operation, it is possible to reduce the to and fro movement of the matrix plate 9 to a minimum sufficient to provide clearance between the opposed faces of the matrix and former, for the passage of the metal foil strip and for the stroke of the knife 16 against the stationary knife 18.

By reducing the stroke of the moving knife 16 carried by the matrix plate 9, the speed of the latter can be lowered, with consequent greater accuracy of movement than in the previous arrangement, where the stroke was a matter of several inches. The result is that the knife is no longer so easily blunted and therefore requires sharpening less frequently.

Foil supply

The foil feed unit comprises a spindle 45 (Figures 1-2) on which the roll R of foil can be mounted. The web L from roll R passes between pressure rollers 46, 47, the upper roller 46 operating as the load roller onto which the necessary load is placed by means of a vertically displaceable bridge 48 moved to pressure and release position by means of a hand lever 49. The lower roller 47 has an embossed surface and is driven by means of a drive as hereinafter described. From rollers 46, 47 the web passes through a lubricating device, indicated generally at 50, between driven rollers 51 whence it passes downwardly over the face of the knife 18 between the

Figure 1:
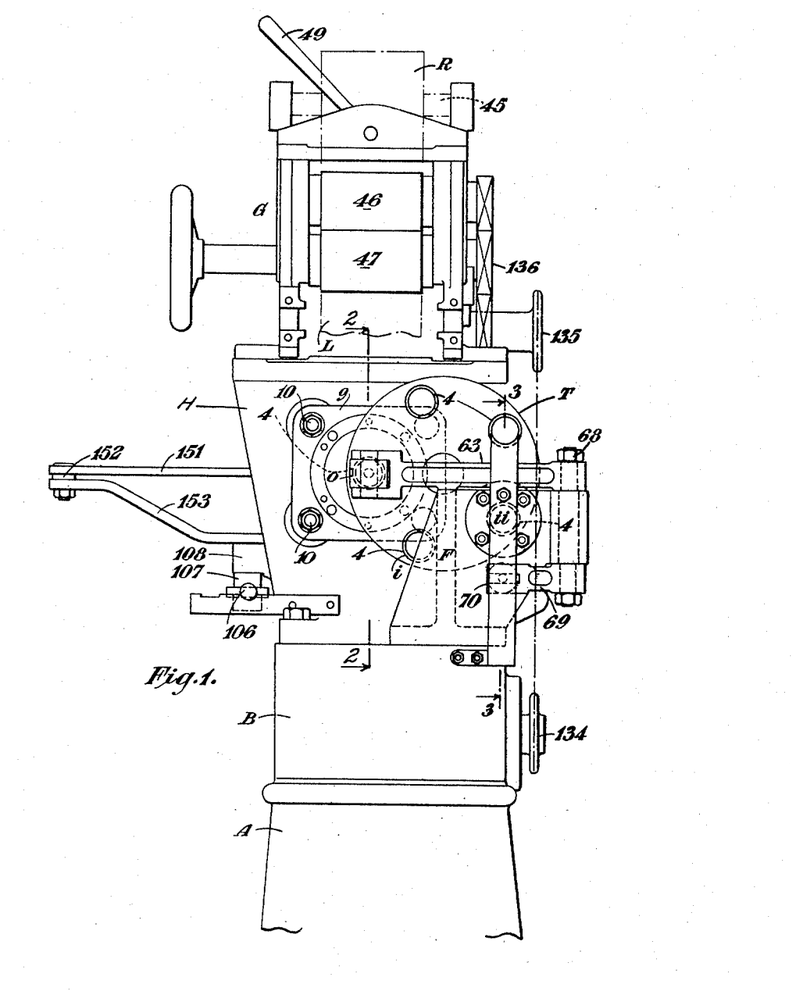
Figure 1 is an elevation as seen from its front or delivery end, of a capsule forming machine capable of forming, smoothing and end embossing a capsule in accordance with the invention.
Figure 3:
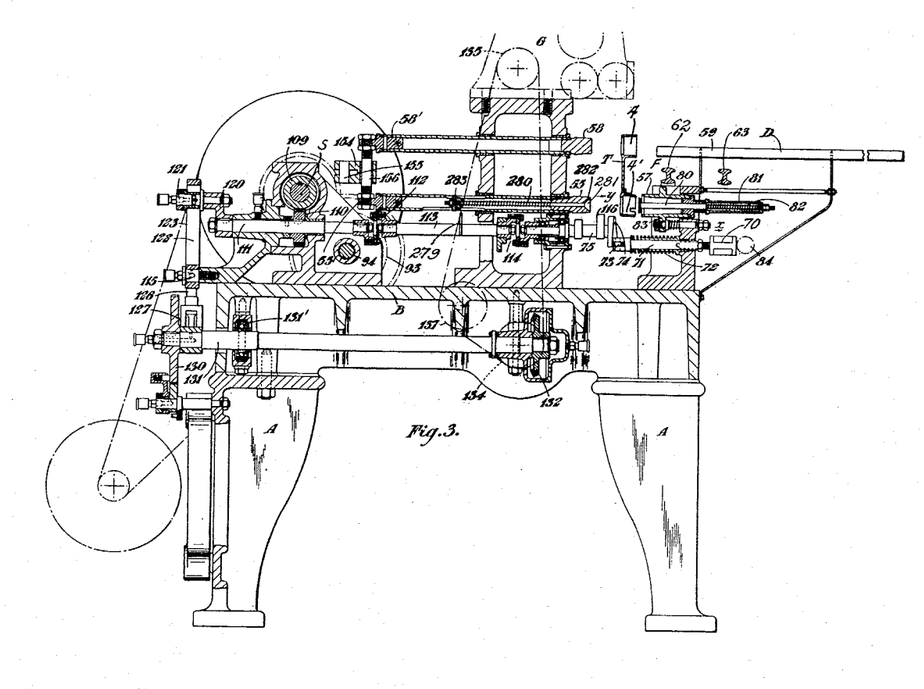
Figure 3 is a longitudinal section also from the left-hand side on the line 3—3 of Figure 1 which is a section taken through the smoothing and ejecting rams.
Figure 6:
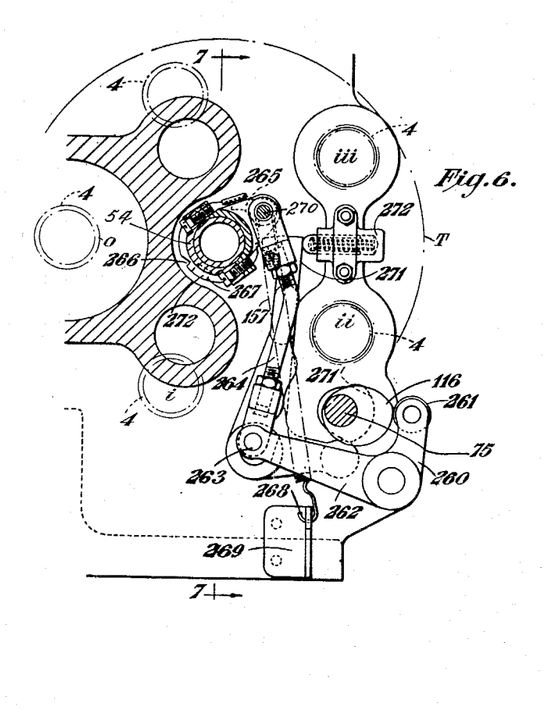
Figure 6 is a detail front sectional elevation of the rotor operating mechanism for the table.
Figure 7:
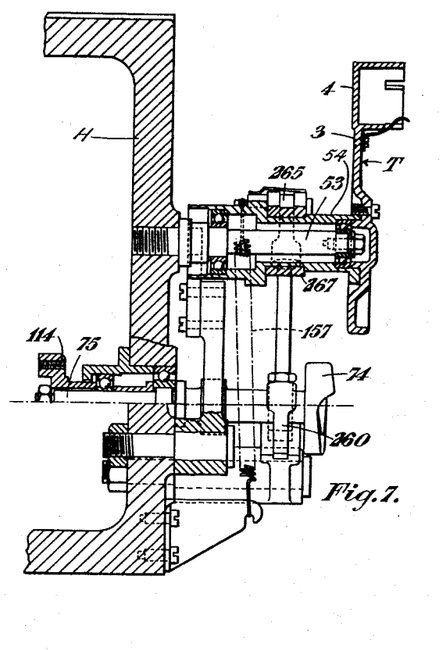
Figure 7 is a detail longitudinal section on the line 7—7 of Figure 6 showing the spindle for the table.

Capsule processing unit (i) *Table.*—The table T as shown in Figure 7 is mounted on a sleeve 54 free to revolve on a spindle 53 in the machine head H and receives an intermittent rotation, being stationary while the completed capsule is delivered by the former or plunger 1 to a zero position which is indicated in Figures 1 and 6 by 0. Assuming a completed pleated capsule has been delivered from the matrix plate 9 into the pocket 4 in the zero position and plunger 1 being withdrawn, the table will be advanced to bring another empty pocket into the zero position, when the pocket containing the pleated capsule will move to position (i); a further advance will move the pocket to position (ii) where the capsule is subjected to the action of a smoothing ram 55, the function of which is to smooth the corrugations by pressure between the ram 55 and a tapered die 57 (Figure 3).

From the smoothing station (ii) the capsule is carried round to the ejection station indicated at (iii) in Figure 6 where a second ram 58 is moved forward in synchronism with the ram 55 to eject the finished capsule onto a chute 59 both rams, as hereinafter described, operating in conjunction with the forming tool.

Figure 2:
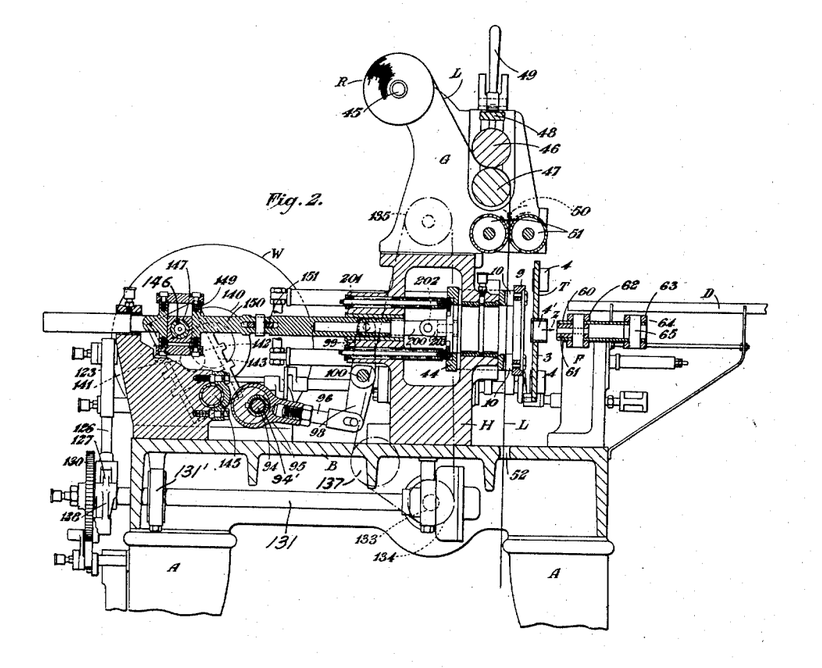
Figure 2 is a general central longitudinal section of the machine viewed from the left-hand side, which is a section through the capsuling matrix being the line 2—2 of Figure 1, details of the plunger and matrix being omitted for clearness.
Figure 4:
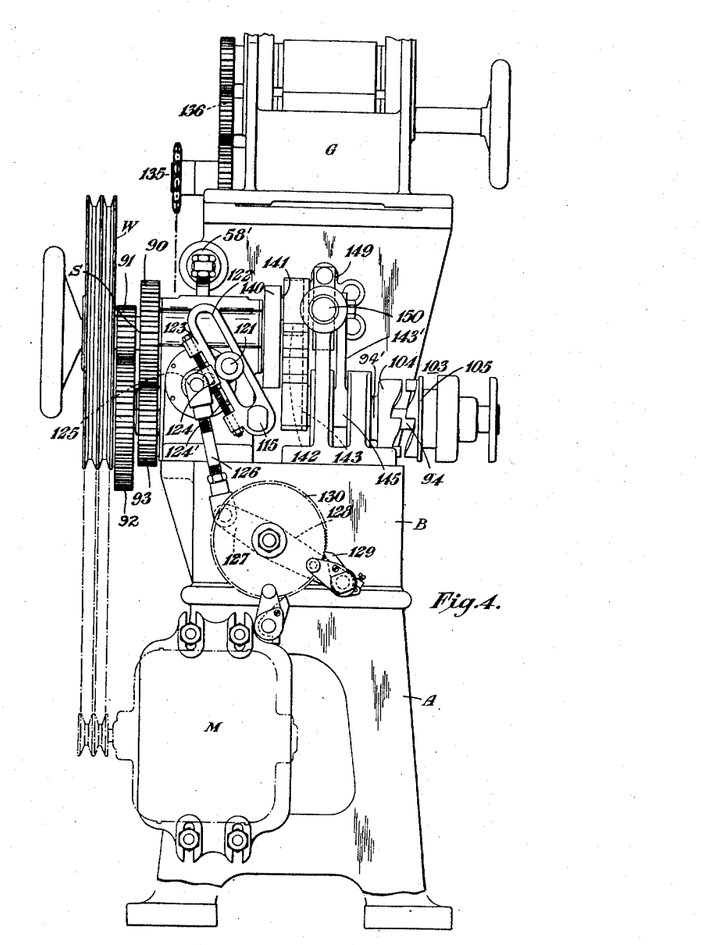
Figure 4 is a rear view showing the main drive.
Figure 4A:
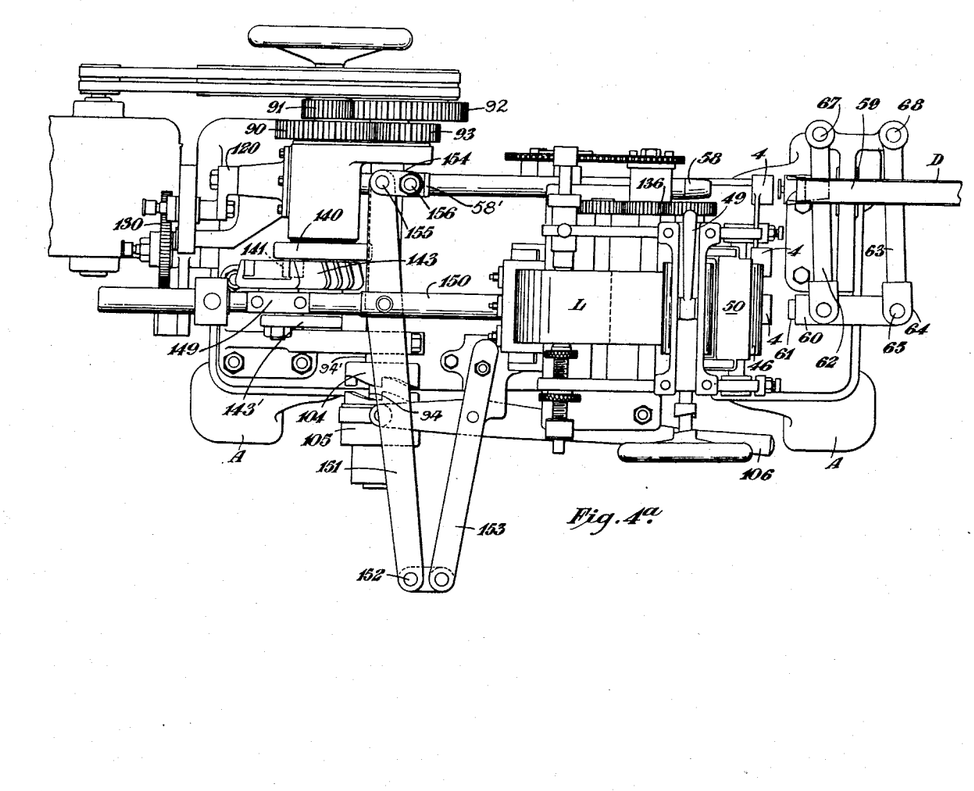
Figure 4a is a plan view of the machine.

(ii) *End printing or embossing.*—When the pleated capsule is delivered by the plunger 1 at zero position, the capsule is carried in the direction of the arrow Z (Figure 2) against an end stamp die in the form of a plug 61 which is detachably mounted in one end of a short tube 60 carried by two parallel operating arms 62, 63 of I-section metal. As shown in Figures 1, 2, and 4a, each of the arms 62, 63 is forked as at 64 to carry a swivel pin 65, about one of which the plug 61 is free to pivot. The lever arms 62, 63 are mounted upon vertical spindles 67, 68, the arm 63 being keyed to the spindle 68 fast to the lower end of which is a lever arm 69, the outer end of arm 69 being forked as at 70 to ride in a recessed block on an actuating or thrust rod 71. The rod 71 is urged in the direction of the table by means of a spring 72 and is provided with a roller 73 for engagement with a rotary cam 74, the cam 74 being mounted on a shaft 75 driven in timed relation with the table as hereinafter described.

In operation, therefore, the cam 74 is rotated to withdraw the thrust rod 71 in direction of arrow X (Figure 3) and thus to swing the lever 69 and arms 62, 63 forwardly so as to withdraw the printing or embossing head, when the latter as the cam continues to rotate, will move rearwardly to meet the plunger 1 carrying the pleated capsule and thus print or emboss a caption on the end of the capsule. At the moment the plunger plus capsule meets the printing or embossing die, which it does at the point of maximum forward movement of the plunger, it will have passed through the die 2 into the empty pocket, indicated at 4' in Figure 2, and since the pockets are designed, as hereinafter explained, to hold and grip the capsules, the capsule will be drawn off the receding plunger and remain in pocket 4'. When the plunger 1 has been completely withdrawn, the table T will start to rotate, pocket 4' with printed or embossed capsule will move into position (i) which is nonoperative. The previous capsule or the capsule in 4' now at position (i) on reaching position (ii) is in alignment with the smoothing ram.

(iii) *Smoothing operation.*—Assuming now that the end printed or embossed capsule has reached station (ii), it will be picked up by the ram 55, which together with ram 58 moves in its stroke in direction of arrow Y (Figure 3), and moved out of pocket 4' in table T into the smoothing die 57, which is arranged on the discharge side of the table T and in which is mounted an ejection plunger 80, the plunger 80 being slidably mounted in a tubular housing 81 against action of a return spring 82. Spring 82 is compressed on the forward stroke of the ram 55 as the latter forces the corrugated capsule into the smoothing die 57 where the corrugations are flattened.

It will be noted that the smoothing die 57 is formed with lugs 83. The smoothing die is spring loaded to give a certain amount of pressure between the base of the smoothing ram and the die 57, so as to provide the necessary working tolerance for thickness of foil and adjustment of ram.

(iv) *Ejection.*—Following the smoothing operation, the capsule is returned by the plunger 80 into the same pocket 4' in table T, from which it was ejected by ram 55 and as soon as the ram 55 has been withdrawn, the table will move forward carrying the smooth, pleated and printed or embossed capsule from station (ii) to station (iii) which is immediately above (ii) and where it comes opposite the ejecting ram 58.

The ejecting ram 58 is synchronised in its movements with the ram 55 and on the next forward stroke of the thrust rod 71 and operative movement of arms 62, 63, ram 58 will enter the pocket 4' in table T to discharge the finished capsule into the chute 59. Counting mechanism indicated generally at 84 (Figure 3) may be provided to record each angular displacement of the arm 69 (Figure 1) and thus to count the capsules as they are produced.

(v) *Pocket construction.*—Each of the pockets 4 in the table (see Figures 11, 12) is provided with a plurality of, conveniently four, resilient arms 175 which are anchored at the entrance end to each pocket and provided at the other end with radial guide fins 176 adapted to enter the grooves between adjacent corrugations formed in the capsule. Owing to the resilient mounting of the fins 176 these will firmly engage the metal wall of the capsule both before and after the corrugations have been flattened at station (ii). Furthermore as the plunger 1 advances the capsule to the die stamp 61 or the ram 55 advances the capsule to the die 57, which movements are through the pocket in direction of arrow Z, the fins will give to compensate for the increasing cross section of the capsule. As the flattened capsule is being returned by the die stamp or by the ejection plunger 80 into the pocket at station (ii), the fins will close down and centre the capsule at its top end, which has the minimum diameter, in the pocket.

Intermediate the arms are radially arranged blades 177 which are provided at their interior ends with shoulders adapted on withdrawal of the smoothing ram to engage the perimeter or base end of the capsule and strip it from the return ram. Likewise at zero station, means are provided for stripping the capsule from the plunger 1 and for this purpose the resilient arms 175 are provided with radial claws 178 to engage the base end of the capsule.

Driving mechanism

Fast to the wheel W is a gear wheel 91 meshing with a gear wheel 92 on a lay shaft 94 (Figure 4) and fast on the crank shaft S is a gear wheel 90 meshing with pinion 93, fast on a sleeve 94' surrounding the lay shaft. On sleeve 94' there is an eccentric 95 carrying a connecting rod 96 whose other end is connected to one arm 98 of a three-armed rock lever, mounted to rock about a spindle 100. The other two arms 99 of the rock lever are pivotally connected at 201 to links 200, said links themselves being pivotally connected at 202 to lugs 203 on the back place 9' or 44 of the matrix. Thus with each rotation of the sleeve 94' the links 200 will receive a to and fro linear displacement in a horizontal plane and so draw the matrix plate 9 to the left as seen in Figures 2, 5 and 8, that is towards the web L. During this time, the knife portion 16 on the matrix operates in conjunction with the other half 18 of the blanking knife to blank out a circular blank from the web foil L and at the same time the back plate 9' or 44 will move the two sets of rods 7 and 8 or 7a and 8a to withdraw the shaping pistons 5 and 6 or 5a and 6a. Also on the lay shaft 94 is a manually operated start and stop clutch 103, one part 104 of which is fast on the sleeve 94' while the other part 105 is slidably keyed to shaft 94 and is controlled by a hand lever 106 (Figure 1) pivotally mounted at 107 on a bracket 108 on the machine bed. On the crank shaft S is a worm gear 109 meshing with a worm wheel 110 fast on a fore and aft spindle 111. The spindle 111 is coupled through a flexible drive, indicated at 112, to a transmission shaft 113 coupled through a second flexible drive 114 to the spindle 75 carrying the cam 74 actuating the thrust rod 71. This spindle 75 is also provided with other cams 171' and 116 which actuate the table drive as hereinafter described.

On the other end of the fore and aft spindle 111 is a crank arm 120 having a crank pin 121 which rides in a slot 122 in a lever arm 123 pivoted at 115 to the frame. On the lever arm 123 is fixedly mounted an adjustable slide block 124 (Fig. 4) provided with a lug 125 which forms an anchorage for a linkage 126 connected to one arm 127 (see also Figure 2) of a two-armed lever, the other arm 128 of which carries a ratchet pawl 129 for engagement with a ratchet wheel 130. The ratchet wheel 130 is keyed to a ratchet spindle 131 rotatably mounted in roller bearings 131' carried in brackets on the underside of the machine bed.

Web foil drive

Spindle 131 at its forward end carries a crown wheel 132 in mesh with a bevel wheel (not shown) on a transverse intermittently driven shaft 133. Shaft 133 at its other end at the right-hand side of the machine has fast on it a chain wheel 134 which drives a chain wheel 135 (Figures 2, 3, and 4) driving the foil feed indicated generally at 136. 137 (Figures 2 and 3) is a tensioner wheel.

It will be seen that for a given number of rotations of the wheel W, the crank 120 will be caused to rotate through one complete revolution and so cause the two-armed lever 127, 128 to rock once up and down so as to advance the ratchet arm 129 over a given number of teeth on the ratchet wheel 130 thus causing a given angular displacement of the ratchet spindle 131 which will produce a proportionate feed of the web foil roll through a distance sufficient to accommodate the width of one complete blank. It will be obvious that the exact amount by which the web feed is advanced may be adjusted by altering the throw of the ratchet pawl 129. This is done by the slide block 124 whose position in relation to the centres of worm wheel shaft 111 and crank 121 can be adjusted by the screw 124', on which block 124 is mounted.

On the inside end of the crank shaft S is a crank wheel 140 (Figures 2, 4, and 4a) having a crank pin 141 which engages a sliding crank block 142 forming part of a Whitworth type crank arm, and which block serves as an angularly variable means of connection between the crank 141 and two rock arms 143, 143' fast on a rock shaft 145. The two arms 143, 143' are coupled by a constant radius drive pin 146, which provides a trunnion mounting for a cross head block 147 slidable in a cross head 149 forming part of a main plunger actuating shaft 150, the front end of which is connected to the plunger 1. It will thus be seen that the motion of the crank 140, 141 is transmitted to shaft 150 through a variable centre so that dependent on the position of the block 142 in its slide the rate of movement of the shaft 150 will be accelerated or retarded.

The use of a Whitworth type motion in the drive of the main actuating shaft 150 enables a slow forward motion coupled with an accelerated rearward motion which slow forward travel of the plunger 1 is essential in the production of the capsule due to the speed of capsule forming being limited by reason of the collapsing of the metal, while by increasing the rate of the return motion, it enables operation and output to be speeded up considerably.

Instead of using a "Whitworth" quick return action the main and auxiliary rams may be operated from a cam to give the required reciprocating motion and a spring loaded quick return action employed. Alternatively the cam may be designed to operate positively on the return stroke, the operative or capsule forming stroke taking place under the action of the spring. This arrangement has the advantage that it gives some measure of protection for the tool, since the cam is arranged to give a positive return action of spring pressure used for the forward stroke (in which the capsule is formed) thereby preventing damage to the tool in the event of jamming, due to portions of foil remaining in the tool or misalignment of the tool mating sections.

Intermediate its ends, the shaft 150 is pivotally connected to a horizontal cross lever 151, from which a to and fro motion is transmitted to the smoothing and ejection rams which rams, by reason of the cross lever, move a distance slightly further than the movement of plunger 1 into the table pocket, in order to carry the two rams 55, 58 with the capsule thereon, into the smoothing die and into the ejecting tray. Lever 151 is anchored at 152 to an offset arm 153 fast on the bracket 108 while its free end is pivoted at 155 to a member 154 pivotally carried on a cross arm 156 to the ends of which the rams 55 and 58 are anchored by eye pieces 55' and 58' respectively.

It will thus be seen that the movement of each ram is co-ordinated with the ratchet drive to the foil unit, the drive being so arranged that the pawl 129 is withdrawn to the beginning of its angular displacement, where it engages the ratchet wheel 130 as the rams are being withdrawn. This ensures that the foil will be fed between the matrix plate and the plunger and shaping pistons while the latter are separated.

*Table drive*

The intermittent rotary drive is taken from the shaft 75 which is constantly revolving. Angular displacement of the table drive sleeve 54 to advance the table between stations is by means of the second cam 116 on spindle 75, with which cam co-operates a two-armed lever indicated generally at 260, one arm of the lever carrying a roller 261 for engagement with the cam while its other arm 262 is pivoted at 263 to an adjustable link 264 carrying a ratchet pawl 265 for engagement with one of five ratchet grooves 266 in a collar 267 fast on the sleeve 54. The lever arm 260 is held against its cam 116 by means of a tension spring 157 anchored to a hook 268 on a bracket 269 on the machine frame and at its other end to the pivot 270 of the ratchet pawl 265.

The cam drive is so timed and set that the rise of the cam 116 comes into operation to rock the lever 260, and thus cause the ratchet pawl 265 to engage one of the grooves 266 to advance the table one complete station, when the rams and the plunger are withdrawn preparatory to their next forward and operative stroke, during which time the capsules in their various stages of completion are being moved forward from one station to another. In order to lock the table, and thus hold it stationary, when it is not being rotated, there is provided a location pawl 271 normally held by spring plunger device 272 in engagement with the locating slots 272¹ in the sleeve 54 corresponding to the locations of the table, and positively disengaged from slots 272¹ by a lock release cam 271¹.

Mounted on the central section 113 of the drive to the cam spindle 75 is a stop finger 279 (Fig. 3) adapted on each revolution of the shaft and thus once for each rotary displacement of the table to enter into a position where it will arrest the movement of a valve stripping spindle 280 (see Fig. 3) which is slidably mounted in the interior of the smoothing ram 55. The spindle 280 at its outer end has a mushroom head 281 constituting a stripper disc and is so arranged that as the smoothing ram 55 moves forwardly the head 181 is closed against a conical seating 282 in the head of the ram. On the return stroke of the ram 55, the stop finger 279 will have moved into position where it will engage a collar 283 at the rear end of the spindle 280, so causing the stripper disc or head 281 to be lifted relatively from its seating and to be held in a position against or in proximity to the ejection plunger 80 thereby preventing any tendency on the part of the smoothing ram to draw back the capsule by suction.

I claim:

1. In a machine for making pleated metal foil capsules, the combination with a head having a reciprocating former including a central plunger, at least one annular shaping piston concentric with said plunger, and means mounting said plunger and said shaping piston for reciprocation, of a matrix plate, means mounting said matrix plate to move relatively toward and away from said head, a matrix mounted on said matrix plate, said matrix having a central throat extending therethrough and being provided with grooves, said plunger and said piston having ribs adapted to cooperate with the grooves in said matrix to form pleats in a metal foil blank interposed between said former and said matrix, actuating mechanism including means operatively connected to said shaping piston for moving said shaping piston into engagement with said matrix and means operatively connected to said plunger adapted to move said plunger into and through said matrix to eject the pleated capsule so formed from said matrix, actuating means operatively connected from said matrix plate adapted to move said plate toward said head prior to movement of said plunger into said matrix and to move said plate away from said head after formation of said capsule, and cooperating cutting means carried by said head and said matrix plate adapted, upon movement of said plate toward said head, to cut blanks from a web of metal foil interposed between said plate and said head.

2. In a machine for making pleated metal foil capsules, the combination with a stationary head having a reciprocating former including a central plunger, at least one annular shaping piston concentric with said plunger, means mounting said plunger for reciprocation, and means mounting said shaping piston for reciprocation independently of said plunger, of a matrix plate, means mounting said matrix plate to move relatively toward and away from the stationary head, a tubular matrix mounted on said matrix plate, said matrix having a central throat extending therethrough and being provided with grooves in said throat and around the entrance thereto, said plunger and said piston having ribs for cooperation with the grooves in said matrix, a lost motion connection between said piston and said plunger, resilient means connected to said piston and biasing it toward said matrix, cooperating cutting means carried by said matrix plate and said head adapted, upon movement of said plate toward said head, to cut blanks from a web of metal foil interposed between said plate and said head, operating means connected to said matrix plate for moving said matrix plate toward said head, and actuating means operatively connected to said plunger for moving said plunger toward said matrix and thereby enabling said resilient means to move said piston with the moving plunger until said piston is arrested by engagement with a metal foil blank interposed between said former and said matrix thereby to form a plurality of pleats in said blank by cooperative action of the ribs on said piston and the grooves around the entrance of said matrix throat, said lost motion connection enabling said plunger to be moved further by said actuating means through said matrix while said piston remains arrested to force the pleated blank into the throat of said matrix while ironing the pleats thereof between the ribs of said plunger and the grooves in said throat, and to eject the pleated capsule so formed from said matrix.

3. In a machine for making pleated metal foil capsules, the combination with a head having a reciprocating former including a central plunger, at least one annular shaping piston concentric with said plunger, and means mounting said plunger and said shaping piston for reciprocation, of a matrix plate, a matrix carried by said matrix plate and having a central throat extending therethrough and provided with grooves, means mounting said matrix plate to move toward and away from said head, said piston having ribs adapted to cooperate with grooves in said matrix to form pleats in a metal foil blank interposed between said former and said matrix and said plunger having ribs adapted to cooperate with the grooves in said matrix, cooperating cutting means carried by said matrix plate and said head adapted, upon movement of said plate toward said head, to cut blanks from a web of foil interposed between said plate and said head, and actuating means for imparting a reciprocatory motion both to said matrix plate and to said former and including one train of connections for moving said matrix plate away from said head to enable feeding of a web between said former and said matrix, and for moving said matrix plate toward said head to effect operation of said cutting means, and another train of connections for operating said former and comprising means for moving said plunger and shaping piston toward the matrix until the shaping piston is arrested by engagement therewith and for continuing the movement of the plunger through the throat of the said matrix while said piston remains arrested thereby to eject from said matrix a pleated metal foil capsule formed therein.

DENIS EASTHOPE RAILTON.

References Cited in the file of this patent

UNITED STATES PATENTS

| Number | Name | Date |
|---|---|---|
| 891,642 | Tietzman | June 23, 1908 |
| 1,504,245 | Huntley | Aug. 12, 1924 |
| 1,591,418 | Ferguson | July 6, 1926 |
| 1,732,704 | Wegner | Oct. 22, 1929 |
| 1,799,357 | Davis | Apr. 7, 1931 |
| 2,019,117 | Conti | Oct. 29, 1935 |
| 2,337,581 | Wiley | Dec. 28, 1943 |
| 2,381,851 | Allen | Aug. 7, 1945 |
| 2,596,050 | Sonnenberg | May 6, 1952 |
| 2,639,645 | Sonnenberg | May 26, 1953 |

FOREIGN PATENTS

| Number | Country | Date |
|---|---|---|
| 11,220 | Great Britain | May 12, 1909 |